United States Patent [19]
Aoyama et al.

[11] Patent Number: 6,098,071
[45] Date of Patent: Aug. 1, 2000

[54] METHOD AND APPARATUS FOR STRUCTURED DOCUMENT DIFFERENCE STRING EXTRACTION

[75] Inventors: Yuki Aoyama, Kawasaki; Junichi Higashino, Musashimurayama, both of Japan

[73] Assignee: Hitachi, Ltd., Tokyo, Japan

[21] Appl. No.: 09/326,579

[22] Filed: Jun. 7, 1999

Related U.S. Application Data

[63] Continuation of application No. 08/657,306, Jun. 3, 1996, Pat. No. 5,956,726.

[30] Foreign Application Priority Data

Jun. 6, 1995 [JP] Japan ................................... 7-161398

[51] Int. Cl.[7] .................................................. G06F 17/30
[52] U.S. Cl. ................................ 707/102; 707/1; 707/5; 707/500; 707/513; 707/515; 707/517; 707/540
[58] Field of Search ................................ 707/102, 513, 707/540, 500, 5, 1, 515, 517

[56] References Cited

U.S. PATENT DOCUMENTS

| | | |
|---|---|---|
| 4,807,182 | 2/1989 | Queen . |
| 5,146,552 | 9/1992 | Cassorla et al. ........................ 707/512 |

(List continued on next page.)

FOREIGN PATENT DOCUMENTS 07200370A  4/1995  Japan .

OTHER PUBLICATIONS

Software Practice and Experience, vol. 21, No. 7, Jul. 1991, Chichester, Sussex, GB, pp. 739–755, XP000297326, by Wuu Yang: "Identifying Syntactic Differences Between Two Programs".

IBM Technical Disclosure Bulletin, vol. 18, No. 6, Nov. 1975, XP002912821, Armonk, New York.

IBM Technical Disclosure Bulletin, vol. 20, No. 1, Jun. 1977, XP002012821, pp. 387–388, "Technique for Compare Files", Armonk, NY.

IBM Technical Disclosure Bulletin vol. 29, No. 10, Mar. 1987, p. 4619, XP002012822, "Automatic Estimator for Source Code Modifications", Armonk, NY.

*Primary Examiner*—Hosain T. Alam
*Assistant Examiner*—Jean M. Corrielus
*Attorney, Agent, or Firm*—Antonelli, Terry, Stout & Kraus, LLP

[57] ABSTRACT

A document difference extraction method and apparatus which is used for extracting the difference between structured documents properly meeting the sense of a document editor taking the logical meaning and structure of the structured documents into consideration. Structured documents are edited and stored in a memory unit by a document editing program. With reference to a comparison criterion set for the logical structure of each structured document before and after edition, the logical structure of the structural documents before and after edition read from the memory unit is analyzed by a structured document parsing program, and the difference between the structured documents is extracted by a structured document difference extraction program in such a manner as to satisfy the comparison criterion in accordance with the result of parsing. The comparison criterion assumes the form of a table containing a plurality of tags representing logical structures and types of tags for the comparison criterion. The tag types for comparison criterion include tags having contents which are compared only when the particular tags are coincident with each other, tags having contents which are ignored at the time of comparison, a set of tags having the same logical meaning, and a set of tags having contents which are not compared with each other.

15 Claims, 24 Drawing Sheets

U.S. PATENT DOCUMENTS

| | | | |
|---|---|---|---|
| 5,261,040 | 11/1993 | Suzuki . | |
| 5,388,257 | 2/1995 | Bauer | 707/1 |
| 5,428,529 | 6/1995 | Hartrick et al. | 707/513 |
| 5,434,962 | 7/1995 | Kyojima et al. | 707/513 |
| 5,438,512 | 8/1995 | Mantha et al. | 707/517 |
| 5,532,920 | 7/1996 | Hartrick et al. | 707/500 |
| 5,544,360 | 8/1996 | Lewak et al. | 707/1 |
| 5,553,216 | 9/1996 | Yoshioka et al. | 707/515 |
| 5,745,745 | 4/1998 | Tada et al. | 707/1 |
| 5,752,020 | 5/1998 | Ando | 707/4 |
| 5,778,400 | 7/1998 | Tateno | 707/513 |
| 5,787,449 | 7/1998 | Vulpe et al. | 707/513 |
| 5,812,999 | 9/1998 | Tateno | 707/3 |
| 5,878,421 | 3/1999 | Ferrel et al. | 707/100 |
| 5,907,851 | 5/1999 | Yamakawa et al. | 707/540 |
| 5,950,196 | 9/1999 | Pyreddy et al. | 707/5 |
| 5,956,726 | 9/1999 | Aoyama et al. . | |

DOCUMENT TREE PRODUCTION PROCEDURE

FIG. 3A
PRIOR ART

```
<MEMO>
 <NAME> TARO HEISEI </NAME>
 <TEXT>
  HELLO.
 </TEXT>
</MEMO>
```

FIG. 3B
PRIOR ART

```
<MEMO>
 <TRANSMISSION DATE> NOVEMBER 20, SIXTH YEAR OF HEISEI
 </TRANSMISSION DATE>
 <TEXT>
  HELLO. ARE YOU FINE ?
 </TEXT>
</MEMO>
```

FIG. 4A
PRIOR ART

```
<MEMO>
 <NAME> TARO HEISEI </NAME>
 <TEXT>
  HELLO.
 </TEXT>
</MEMO>
```

FIG. 4B
PRIOR ART

```
<MEMO>
 <TRANSMISSION DATE> NOVEMBER 20, SIXTH YEAR OF HEISEI
 </TRANSMISSION DATE>
 <TEXT>
  HELLO. ARE YOU FINE ?
 </TEXT>
</MEMO>
```

UNDERLINED PARTS : DIFFERENCE CHARACTER STRINGS

FIG. 5A
PRIOR ART

```
<TREATISE>
 <AUTHOR NAME> TARO HEISEI </AUTHOR NAME>
 <CHAPTER>
  <CHAPTER NUMBER> CHAPTER 1 </CHAPTER NUMBER>
   STRUCTURED DOCUMENT DIFFERENCE EXTRACTION METHOD
 </CHAPTER>
</TREATISE>
```

FIG. 5B
PRIOR ART

```
<TREATISE>
 <AUTHOR NAME> TARO HEISEI </AUTHOR NAME>
 <CHAPTER>
  <CHAPTER NUMBER> CHAPTER 1 </CHAPTER NUMBER>
   WHAT IS STRUCTURED DOCUMENT ?
 </CHAPTER>
 <CHAPTER>
  <CHAPTER NUMBER> CHAPTER 2 </CHAPTER NUMBER>
   STRUCTURED DOCUMENT DIFFERENCE EXTRACTION METHOD
 </CHAPTER>
</TREATISE>
```

FIG. 6A
PRIOR ART

```
<TREATISE>
 <AUTHOR NAME> TARO HEISEI </ AUTHOR NAME>
 <CHAPTER>
  <CHAPTER NUMBER> CHAPTER 1 </ CHAPTER NUMBER>
   STRUCTURED DOCUMENT DIFFERENCE EXTRACTION METHOD
 </ CHAPTER>
</ TREATISE>
```

FIG. 6B
PRIOR ART

```
<TREATISE>
 <AUTHOR NAME> TARO HEISEI </ AUTHOR NAME>
 <CHAPTER>
  <CHAPTER NUMBER> CHAPTER 1 </ CHAPTER NUMBER>
   WHAT IS STRUCTURED DOCUMENT ?
 </ CHAPTER>
 <CHAPTER>
  <CHAPTER NUMBER> CHAPTER 2 </ CHAPTER NUMBER>
   STRUCTURED DOCUMENT DIFFERENCE EXTRACTION METHOD
 </ CHAPTER>
</ TREATISE>
```

UNDERLINED PARTS : DIFFERENCE CHARACTER STRINGS

FIG. 7A
PRIOR ART

```
<TREATISE>
 <AUTHOR NAME> TARO HEISEI </AUTHOR NAME>
 <FIRST ITEM>
  STRUCTURED DOCUMENT DIFFERENCE EXTRACTION METHOD
 </FIRST ITEM>
</TREATISE>
```

FIG. 7B
PRIOR ART

```
<TREATISE>
 <AUTHOR NAME> TARO HEISEI </AUTHOR NAME>
 <FIRST ITEM>
  WHAT IS STRUCTURED DOCUMENT ?
 </FIRST ITEM>
 <ITEM>
  STRUCTURED DOCUMENT DIFFERENCE EXTRACTION METHOD
 </ITEM>
</TREATISE>
```

FIG. 8A PRIOR ART

```
<TREATISE>
  <AUTHOR NAME> TARO HEISEI </AUTHOR NAME>
  <FIRST ITEM>
    STRUCTURED DOCUMENT DIFFERENCE EXTRACTION METHOD
  </FIRST ITEM>
</TREATISE>
```

FIG. 8B PRIOR ART

```
<TREATISE>
  <AUTHOR NAME> TARO HEISEI </AUTHOR NAME>
  <FIRST ITEM>
    WHAT IS STRUCTURED DOCUMENT ?
  </FIRST ITEM>
  <ITEM>
    STRUCTURED DOCUMENT DIFFERENCE EXTRACTION METHOD
  </ITEM>
</TREATISE>
```

UNDERLINED PARTS : DIFFERENCE CHARACTER STRINGS

FIG. 9

| COMPARISON CRITERION TABLE | | |
|---|---|---|
| ITEM NO. | TAG | TYPE OF COMPARISON CRITERION |
| 1 | <NAME> | IDENTITY TAG |
| 2 | <TRANSMISSION DATE> | IDENTITY TAG |

PRODUCTION PROCEDURE FOR
DOCUMENT TREE OF FIG. 10A

FIG. 11A

```
<MEMO>
 <NAME> TARO HEISEI </ NAME>
 <TEXT>
  HELLO.
 </ TEXT>
</ MEMO>
```

FIG. 11B

```
<MEMO>
 <TRANSMISSION DATE> NOVEMBER 20, SIXTH YEAR OF HEISEI
 </ TRANSMISSION DATE>
 <TEXT>
  HELLO. ARE YOU FINE ?
 </ TEXT>
</ MEMO>
```

UNDERLINED PARTS : DIFFERENCE CHARACTER STRINGS

FIG. 12

| COMPARISON CRITERION TABLE | | |
|---|---|---|
| ITEM NO. | TAG | TYPE OF COMPARISON CRITERION |
| 1 | <AUTHOR NAME> | IDENTITY TAG |
| 2 | <CHAPTER NUMBER> | IGNORING TAG |

FIG. 14A

```
<TREATISE>
 <AUTHOR NAME> TARO HEISEI </ AUTHOR NAME>
 <CHAPTER>
   <CHAPTER NUMBER> CHAPTER 1 </ CHAPTER NUMBER>
     STRUCTURED DOCUMENT DIFFERENCE EXTRACTION METHOD
 </ CHAPTER>
</ TREATISE>
```

FIG. 14B

```
<TREATISE>
 <AUTHOR NAME> TARO HEISEI </ AUTHOR NAME>
 <CHAPTER>
   <CHAPTER NUMBER> CHAPTER 1 </ CHAPTER NUMBER>
    WHAT IS STRUCTURED DOCUMENT ?
 </ CHAPTER>
 <CHAPTER>
   <CHAPTER NUMBER> CHAPTER 2 </ CHAPTER NUMBER>
     STRUCTURED DOCUMENT DIFFERENCE EXTRACTION METHOD
 </ CHAPTER>
</ TREATISE>
```

UNDERLINED PARTS : DIFFERENCE CHARACTER STRINGS

FIG. 15

| COMPARISON CRITERION TABLE | | |
|---|---|---|
| ITEM NO. | TAG | TYPE OF COMPARISON CRITERION |
| 1 | <AUTHOR NAME> | IDENTITY TAG |
| 2 | <ITEM><br><FIRST ITEM> | } EQUIVALENCE TAG |

FIG. 17A

```
<TREATISE>
 <AUTHOR NAME> TARO HEISEI </ AUTHOR NAME>
 <FIRST ITEM>
   STRUCTURED DOCUMENT DIFFERENCE EXTRACTION METHOD
 </ FIRST ITEM>
</ TREATISE>
```

FIG. 17B

```
<TREATISE>
 <AUTHOR NAME> TARO HEISEI </ AUTHOR NAME>
 <FIRST ITEM>
   WHAT IS STRUCTURED DOCUMENT ?
 </ FIRST ITEM>
 <ITEM>
   STRUCTURED DOCUMENT DIFFERENCE EXTRACTION METHOD
 </ ITEM>
</ TREATISE>
```

UNDERLINED PARTS : DIFFERENCE CHARACTER STRINGS

FIG. 18A

```
<MEMO>
  <SENDER>
    <ORGANIZATION> OO BANK </ORGANIZATION>
    <NAME> TARO HEISEI </NAME>
  </SENDER>
  <TEXT>
    HELLO.
  </TEXT>
</MEMO>
```

FIG. 18B

```
<MEMO>
  <RECEIVER>
    <ORGANIZATION> XX BANK </ORGANIZATION>
    <NAME> TARO SHOWA </NAME>
  </RECEIVER>
  <TEXT>
    HELLO. ARE YOU FINE ?
  </TEXT>
</MEMO>
```

FIG. 19

| COMPARISON CRITERION TABLE ||| 
|---|---|---|
| ITEM NO. | TAG | TYPE OF COMPARISON CRITERION |
| 1 | <SENDER> | } NO-COMPARISON TAG |
| 2 | <RECEIVER> | |

FIG. 21A

```
<MEMO>
  <SENDER>
    <ORGANIZATION>  ○○ BANK </ORGANIZATION>
    <NAME> TARO HEISEI </NAME>
  </SENDER>
  <TEXT>
    HELLO.
  </TEXT>
</MEMO>
```

FIG. 21B

```
<MEMO>
  <RECEIVER>
    <ORGANIZATION> x x BANK </ORGANIZATION>
    <NAME> TARO SHOWA </NAME>
  </RECEIVER>
  <TEXT>
    HELLO. ARE YOU FINE ?
  </TEXT>
</MEMO>
```

UNDERLINED PARTS : DIFFERENCE CHARACTER STRINGS

FIG. 23A

```
<MEMO>
 <TRANSMITTER>
  <NAME> TARO HEISEI </NAME>
 </TRANSMITTER>
 <TEXT>
  HELLO.
 </TEXT>
</MEMO>
```

STRUCTURED DOCUMENT a

FIG. 23B

```
<MEMO>
 <TRANSMITTER>
  <NAME> JIRO SHOWA </NAME>
  <ORGANIZATION> ABC COMPANY </ORGANIZATION>
 </TRANSMITTER>
 <TEXT>
  HELLO. ARE YOU FINE ?
 </TEXT>
</MEMO>
```

STRUCTURED DOCUMENT a'

FIG. 24A  EXAMPLE OF DIFFERENCE DATA

| ITEM NO. | DIFFERENCE DATA | |
|---|---|---|
| 1 | "TARO HEISEI" IN <NAME> CHANGED TO "JIRO SHOWA" | ~601 |
| 2 | CHILD STRUCTURE "<ORGANIZATION> ABC COMPANY </ORGANIZATION> OF <SENDER>" INSERTED BEHIND STRUCTURE <NAME> | ~602 |
| 3 | "ARE YOU FINE ?" IN <TEXT> INSERTED AT SEVENTH CHARACTER | ~603 |

FIG. 24B  COMPARATIVE EXAMPLE OF DIFFERENCE DATA DISPLAY

CHANGE PORTIONS

```
<MEMO>
 <SENDER>
  <NAME> JIRO SHOWA </ NAME>
  <ORGANIZATION> ABC COMPANY </ ORGANIZATION>
 </ SENDER>
 <TEXT>
  HELLO. ARE YOU FINE ?
 </ TEXT>
</ MEMO>
```

FIG. 25  EXAMPLE OF STRUCTURED DIFFERENCE DATA

```
<MEMO>
 <TRANSMITTER>
  <NAME>
   <BEFORE CHANGE> TARO HEISEI </ BEFORE CHANGE>
   <AFTER CHANGE> JIRO SHOWA </ AFTER CHANGE>
  </ NAME>
  <ORGANIZATION diffflag = INSERTION> ABC COMPANY
  </ ORGANIZATION>
  <TEXT>
   HELLO. <INSERTION> ARE YOU FINE ? </ INSERTION>
  </ TEXT>
</ MEMO>
```

FIG. 27

| STRUCTURED DOCUMENT DIFFERENCE DATA .SGM ||
|---|---|
| § MEMO | |
| § TRANSMITTER | |
| ¶ NAME | ~~TAOR HEISEI~~ JIRO SHOWA |
| ¶ ORGANIZATION | ABC COMPANY |
| ¶ TEXT | HELLO. ARE YOU FINE ? |

METHOD AND APPARATUS FOR STRUCTURED DOCUMENT DIFFERENCE STRING EXTRACTION

This is a continuation of application Ser. No. 08/657,306, filed Jun. 3, 1996, now U.S. Pat. No. 5,956,726.

BACKGROUND OF THE INVENTION

The present invention relates to a structured document difference string extraction method and apparatus for a document processor such as a word processor capable of extracting a difference character string between structured documents stored as an electronic file.

A structured document is defined as one having embedded therein, i.e., containing information on the logical structure of a document, that is, information such as "this portion of the document constitutes a chapter" or "this portion makes up a title".

The difference extraction between documents is defined as detecting a most coincident combination of elements constituting each document including paragraphs, lines and characters and extracting non-coincident elements as a difference. Suppose that two documents for which the difference is to be detected are "ABCDEFG" and "ACDAEFH". When the two documents are compared in terms of elements thereof including A, B, C, D, E, F, G and H, the most coincident combination is detected as "correspondence of ACDEF". Also, the difference is detected in the form of "B is deleted", "A is inserted after D" or "G is changed to H".

A conventional method for difference extraction is disclosed in JP-A-2-255964, in which comparison is made in terms of punctuation marks, lines, words and characters. In application of this method to structured documents, a character string representing a logical structure contained in the documents is compared in the same manner as other character strings are compared in the documents.

Extraction of a difference in a structured document by the same means as in a normal document may be inappropriate to the document editor, however, since the result may be non-coincident with the logical structure of the document.

The following Examples 1–3 were considered by the Applicants during development of the present invention, and have not been known or published publicly.

EXAMPLE 1

With reference to the structured documents shown in FIGS. 3A and 3B, the case will be explained in which documents having non-coincident logical structures are erroneously matched with each other in the process of difference extraction, thereby leading to an extraction result inappropriate to the document editor.

The structured documents in FIGS. 3A and 3B are described by SGML (Standard Generalized Markup Language; ISO 8879), indicating that a character string sandwiched by marks, for example, <A> and </A> called tags is associated with a logical structure A. In other words, the character string. "TARO HEISEI" sandwiched between "<NAME>" and "</NAME>" of FIG. 3A is associated with the logical structure "NAME". HTML (Hypertext Markup Language) which is used in WWW (World Wide Web) is an application of SGML and is applicable to the present invention as well.

Another name of the mark representing this logical structure is a tag. "<A>" and "</A>" thus are alternatively called a start tag and an end tag, respectively.

The result of extracting a difference character string between two structured documents in FIGS. 3A and 3B is shown in FIGS. 4A and 4B.

FIG. 4B shows the result of extracting difference character strings of the structured document in FIG. 3B relative to the structured document in FIG. 3A. FIG. 4A shows the result of extracting difference character strings of the structured document in FIG. 3A relative to the structured document in FIG. 3B.

As seen from FIGS. 4A and 4B, "HEISEI" associated with "<NAME>" and "HEISEI" associated with "<TRANSMISSION DATE>" are not extracted as the difference. This is due to the fact that "HEISEI" was coincident and erroneously matched with each other. This correspondence of "HEISEI" not coincident in logical structure is obviously meaningless to the document editor.

EXAMPLE 2

With reference to the structured documents shown in FIGS. 5A and 5B, the case will be explained in which character strings are matched erroneously over different document structures in the process of difference extraction due to the insertion of a document structure, thereby leading to an extraction result not proper to the document editor. FIG. 5A shows a structured document having Chapter 1, and FIG. 5B a structured document with one other chapter inserted before Chapter 1.

FIGS. 6A, 6B show an example of extracting a difference character string between the two structured documents of FIGS. 5A, 5B.

FIGS. 6A, 6B show a case similar to FIGS. 4A, 4B, in which FIG. 6B shows the result of extracting a difference character string of FIG. 5B relative to FIG. 5A. FIG. 6A, on the other hand, shows the result of extracting a difference character string of FIG. 5A relative to FIG. 5B.

As seen from FIG. 6A, Chapter 1 of FIG. 6A is matched over Chapter 1 and Chapter 2 of FIG. 6B in spite of the fact that Chapter 1 of FIG. 6A is identical to Chapter 2 of FIG. 6B. This is another case inappropriate to the document editor.

Dual appearance in FIG. 5B of the same character string "STRUCTURED DOCUMENT" unlike in FIG. 5A leads to the erroneous decision in FIG. 6B that the first "STRUCTURED DOCUMENT" is coincident while the second "STRUCTURED DOCUMENT" is non-coincident, so that the second "STRUCTURED DOCUMENT" and extracted as a difference. This is true with each of subsequent cases of difference extraction.

EXAMPLE 3

With reference to the structured documents of FIGS. 7A, 7B, explanation will be made of the case in which the difference in marks representing the logical structure of a document makes it impossible to match the contents of documents with each other in spite of the identical logical meaning of the documents, resulting in the extraction inappropriate to the document editor.

In FIGS. 7A, 7B, a tag <FIRST ITEM> is attached to only the item that first appears in spite of the fact that the logical meaning of the document remains the same and "ITEM".

FIGS. 8A, 8B show the case in which difference character strings between two structured documents of FIGS. 7A and 7B are extracted by the conventional technique.

FIGS. 8A, 8B represent a case similar to FIGS. 4A, 4B, in which FIG. 8B shows the result of extracting difference character strings of FIG. 7B as compared with FIG. 7A, while FIG. 8A shows the result of extracting difference character strings of FIG. 7A as compared with FIG. 7B.

From FIGS. 8A, 8B, it is seen that "FIRST ITEMs" are matched with each other and the character strings associated with them are compared with each other as the contents thereof. The logical meaning of "FIRST ITEM" and "ITEM" are the same for the document editor, and therefore the contents of the tags are required to be matched in priority over the tags.

In extracting the difference between structured documents, comparison between them is required taking into consideration the logical meaning and the structure of the structured documents. This requirement is not met by the conventional method in which character strings indicating a logical structure are compared in similar fashion to other character strings in the document.

SUMMARY OF THE INVENTION

An object of the present invention is to provide a method and an apparatus for extracting a difference character string between structured documents in a manner suited to the linguistic sense of the document editor taking the logical meaning and structure of the structure documents into consideration.

Another object of the present invention is to provide a method and an apparatus for managing the editing of a structured document for a document processing system capable of managing the editing on the basis of comparison and discrimination of the logical structures of structured documents.

In order to achieve the above-mentioned objects, according to one aspect of the invention, there is provided a structured document difference extraction method including memory means for storing structured documents defined as information on the logical structure of documents before and after editing such as deletion, insertion or change, and a processor for extracting a character string non-coincident between the structured documents before and after editing as a difference, comprising the steps of:

editing and storing a structured document in the memory means;

parsing the logical structures of the structured document before and after editing read from the memory unit on the basis of a set comparison criterion; and extracting the difference between the structured documents in such a manner as to satisfy the comparison criterion in accordance with the result of parsing of the structured documents.

The comparison criterion includes tags indicating logical structures and types of comparison criterion corresponding to the tags with the contents thereof being stored in a table.

The tags are defined to be ones of the following four types of comparison criterion:

(1) Tags having the contents which are compared only when the particular tags are coincident with each other (identity tags)

(2) Tags having the contents the difference of which is ignored at the time of comparison (ignoring tags)

(3) A set of tags identical to each other in logical meaning (equivalence tags, such as "FIRST ITEM" and "ITEM")

(4) A set of tags having the contents which are not compared with each other (no-comparison tags)

Furthermore, a document tree representing the structure of each structured document is produced by the above-mentioned parsing method, and the difference between the structured documents is extracted by comparison between the nodes of the respective document trees. In the case where given nodes are non-coincident with each other, the difference is extracted between the nodes by comparison between the characters of the nodes.

In addition, in producing a document tree or hierarchy representing each document structure by the aforementioned parsing method, the allocation of the nodes of the document trees is altered in accordance with the comparison criterion described above.

According to another aspect of the invention, there is provided a structured document difference extraction apparatus comprising a memory means for storing structured documents before and after editing including deletion, insertion or change, and a processor for extracting at least a non-coincident character string of each structured document before and after editing as a difference between the structured documents, wherein:

the processor includes means for editing the structured documents and storing the result of editing in the memory means, means for parsing the logical structure of structured documents before and after editing read from the memory means on the basis of a preset comparison criterion, and means for extracting the difference between the structured documents in such a manner as to meet the comparison criterion in accordance with the result of parsing of the structured documents.

The extraction means includes a table for storing tags representing logical structures and types of criterion for the tags.

The following four criterion types of tags are defined beforehand for comparison:

(1) Tags having the contents which are compared only when the particular tags are coincident with other.

(2) Tags having the contents the difference of which is ignored at the time of comparison.

(3) A set of tags identical in logical meaning to each other and (4) A set of tags having the contents which are not compared with each other.

Further, the structured document parsing means produces a document tree representing the structure of each document, and the structured document difference extraction means extracts the difference between the structured documents before and after editing by comparing the respective document trees by node. When a given pair of nodes between a pair of structured documents fail to coincide with each other, the difference is extracted by comparing the particular nodes, this time, by character.

In addition, the structured document parsing means, when producing a document tree representing a document structure, alters the allocation of the nodes of the document tree in accordance with the comparison criterion.

With the solutions as described above, structured documents are edited, the logical structure of the editing structured documents is analyzed by the structured document parsing means, a comparison criterion used for extracting the difference corresponding to the logical structure is set in advance, and a difference character string between the structured documents before and after editing is extracted in such a manner as to meet the comparison criterion. The more relevant difference conforming with the linguistic sense of the editor can thus be automatically extracted in accordance with the logical structure.

Also, the difference is extracted by node between document trees, whereas the difference between non-coincident nodes is extracted by character, so that an erroneous extraction of the difference over different structures can be eliminated.

BRIEF DESCRIPTION OF THE DRAWINGS

FIGS. 3A, 3B are diagrams showing a first example of structured documents before and after editing respectively.

FIGS. 4A, 4B are diagrams showing the first example of the structured documents before and after difference extraction, respectively.

FIGS. 5A, 5B are diagrams showing a second example of structured documents before and after editing respectively.

FIGS. 6A, 6B are diagrams showing the second example of the structured documents before and after difference extraction, respectively editing.

FIGS. 7A, 7B are diagrams showing a third example of structured documents before and after respectively.

FIGS. 8A, 8B are diagrams showing the third example of the structured documents before and after difference extraction, respectively.

FIG. 9 shows an example comparison criterion table for the first example of structured documents according to the present invention.

FIGS. 11A, 11B are diagrams showing the first example of the structured documents before and after difference extraction, respectively based on the comparison criterion table of FIG. 9.

FIG. 12 shows an example comparison criterion table for the second example of the structured documents shown in FIG. 5.

FIGS. 14A, 14B are diagrams showing the second example of the structured documents of FIGS. 5A, 5B before and after difference extraction, respectively based on the comparison criterion table of FIG. 12.

FIG. 15 shows an example comparison criterion table for a third example of the structured documents shown in FIGS. 7A, 7B.

FIGS. 17A, 17B are diagrams showing the third example of structured documents of FIGS. 7A, 7B before and after difference extraction, respectively based on the comparison criterion table of FIG. 15.

FIGS. 18A, 18B are diagrams showing a fourth example of structured documents before and after editing respectively.

FIG. 19 shows an example comparison criterion table for the fourth example of the structured documents shown in FIG. 18.

FIGS. 21A, 21B are diagrams showing the fourth example of structured documents shown in FIG. 18 before and after difference extraction, respectively based on the comparison criterion table of FIG. 19.

FIGS. 23A, 23B are diagrams showing an example comparison of documents to be compared according to the embodiment of FIG. 22.

FIGS. 24A, 24B are diagrams showing an example result of comparison between the structured documents of FIGS. 23A, 23B, respectively.

FIG. 25 is a diagram showing an example structured document representing the structured document difference data.

FIG. 27 is a diagram showing an example of a structured document difference data displayed on the screen.

DESCRIPTION OF THE PREFERRED EMBODIMENTS

Embodiments of the invention will be described below with reference to the accompanying drawings.

Figure 1:
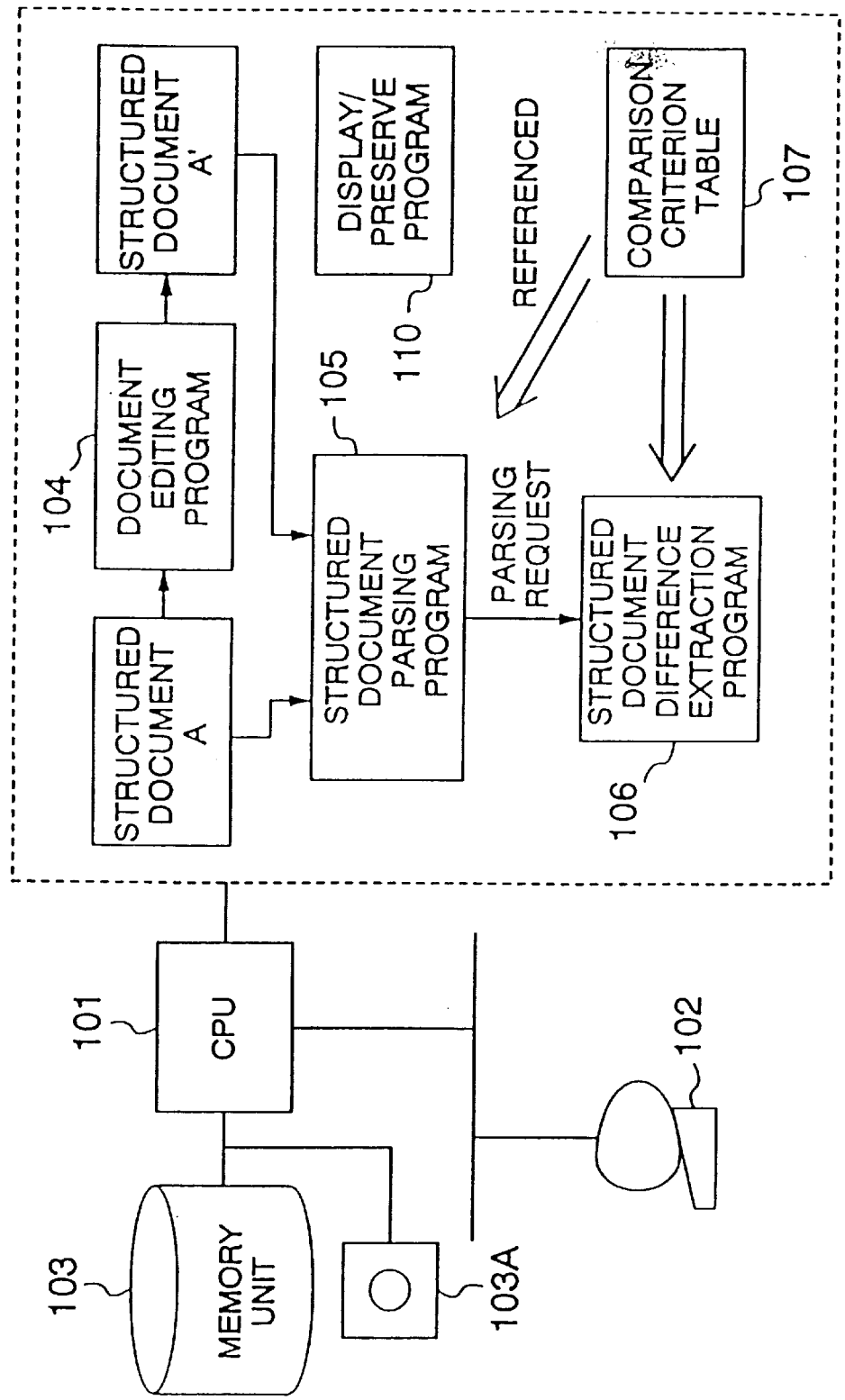
FIG. 1 is a block diagram showing the configuration of an embodiment of the present invention.

FIG. 1 shows the configuration of an embodiment of the invention.

In FIG. 1, a reference numeral 101 designates a CPU, numeral 102 a terminal device including an input/output device, a display device and a program storage loading device 103A on which a processing program storing medium such as a floppy disk or the like is mounted, and numeral 103 a memory unit for storing documents and/or a processing program, capable of functioning as a program storage alternative to the floppy disk. The CPU 101 has executably set therein a document editing program 104 for editing documents, a structured document parsing program 105 for converting each structured document into a tree configuration, a structured document difference extraction program 106 for extracting non-coincident portions of the structured documents as a difference, and a comparison criterion table 107 for storing comparison criteria for extraction of difference character strings. These programs can be supplied to the CPU 101 in a form stored in the floppy disk in advance.

Each of the structured documents according to this embodiment assumes the form of an SGML document. SGML, as described above, is defined as a document description language set as an ISO world standard of marked structured documents. SGML documents have the logical structure thereof defined in advance by the document type definition (DTD). Nevertheless, it should be understood that the present embodiment is applicable also to the processing of structured documents having a function analogous to SGML.

Specific processing steps according to the present embodiment will be described with reference to the flowcharts of FIGS. 2A and 2B.

Step 201

Structured documents are edited by the document editing program 104.

Step 202

The comparison criterion table 107 corresponding to the DTD of the SGML documents to be compared is read into the work area of the CPU 101.

In the absence of a comparison criterion table corresponding to the DTD of the SGML documents, an appropriate table is prepared and entered in advance.

This comparison criterion table includes includes tags satisfying the following four criteria:

(1) Identity tag: It represents different tags allowing the respective contents thereof, i.e., the characters sandwiched between the start and end ones of the respective tags to be compared with each other only when the tag pairs are coincident with each other.

(2) Ignoring tag: It represents a tag having contents of which the difference is ignored at the time of comparison (3) Equivalence tags: These represent a set of apparently different tags having the same logical meaning (4) No-comparison tags: These represent a set of tags which negate the comparison of the contents thereof with each other Step 203

Figure 2A:
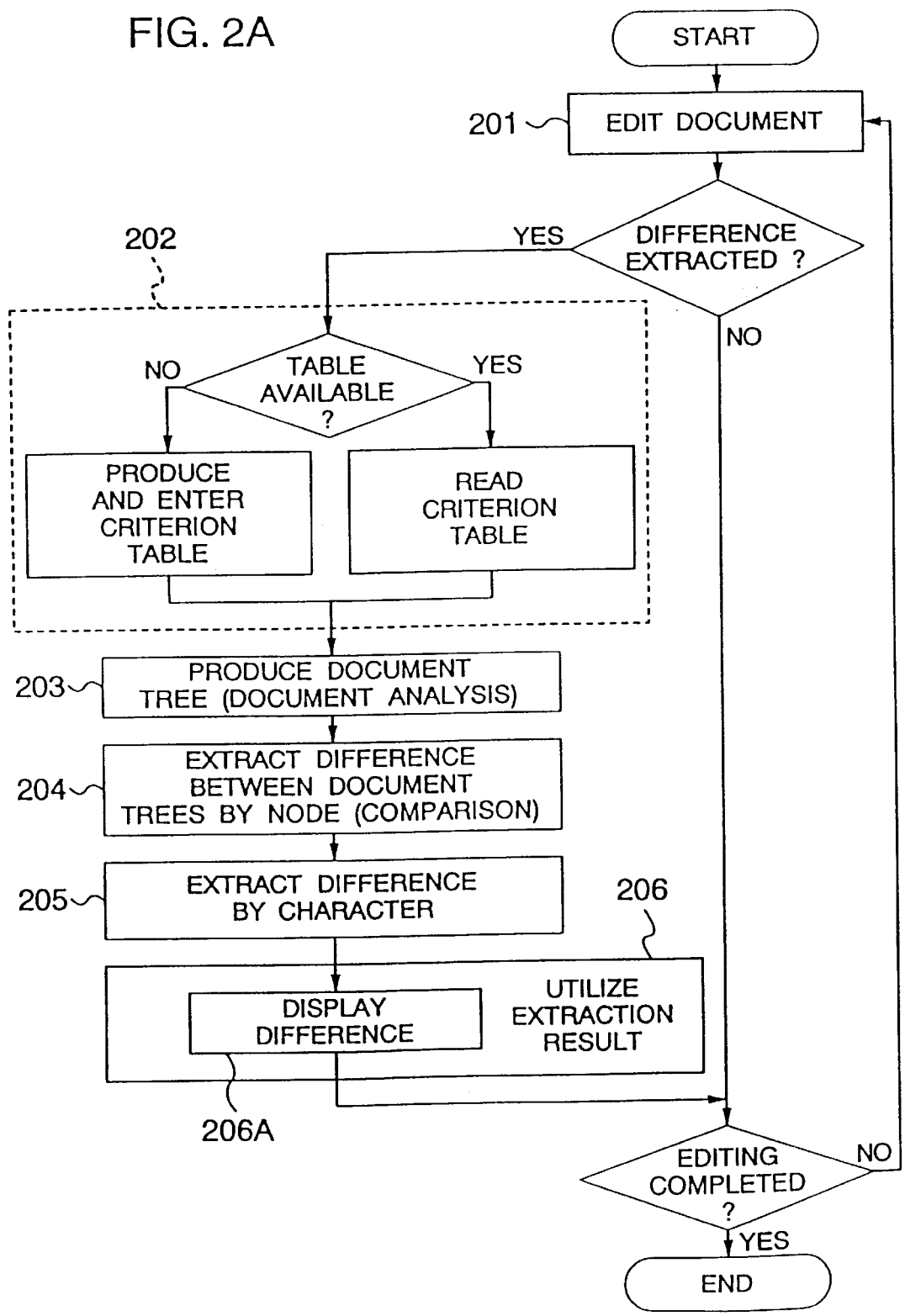
FIG. 2A is a diagram showing the processing steps according to an embodiment of the invention.
Figure 2B:
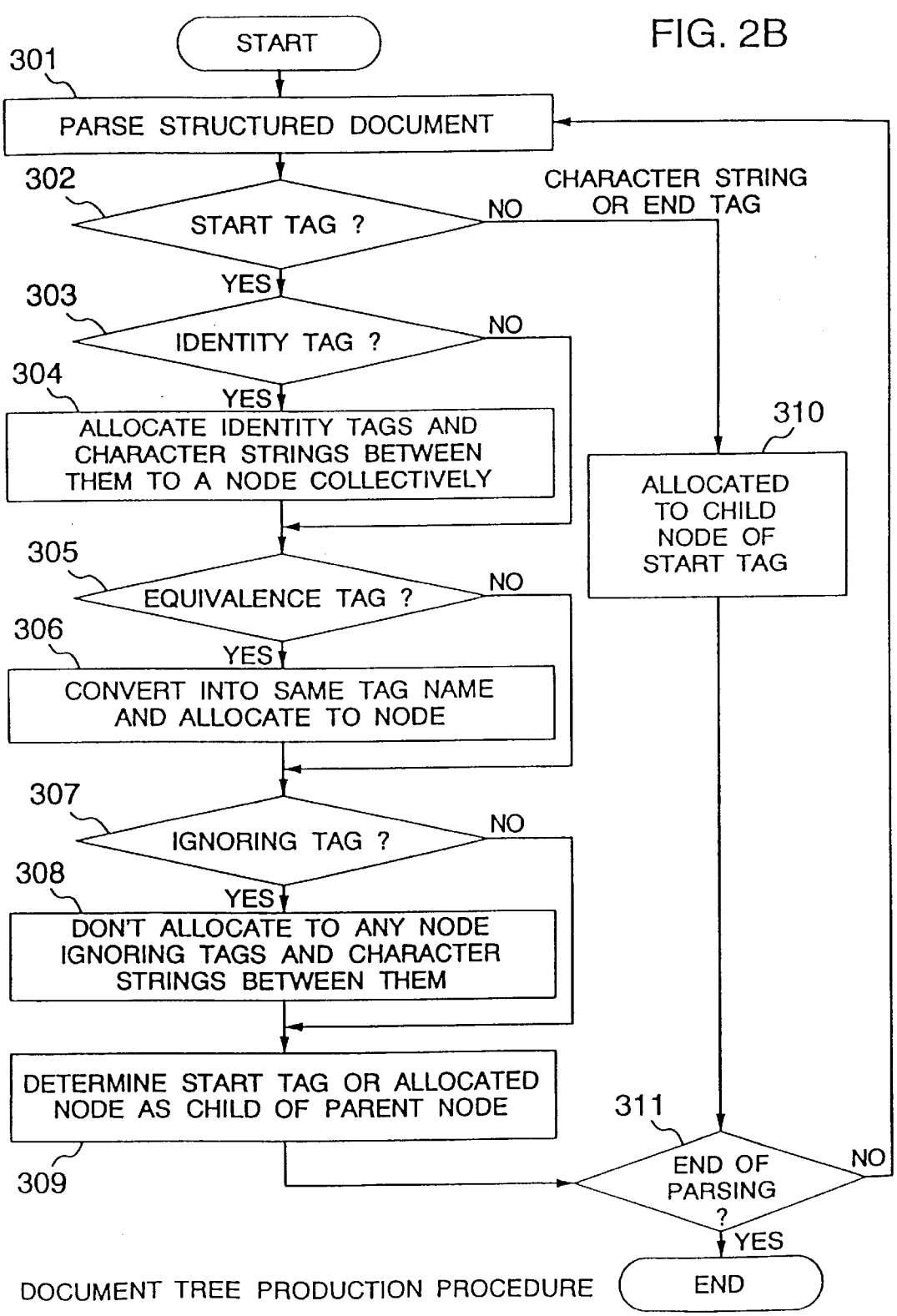
FIG. 2B is a flowchart showing a detailed example of steps of producing a document tree shown in FIG. 2A.

When the difference extraction program 106 is called in FIG. 2A, the structured documents are analyzed by the structured document parsing program 105 by reference to the comparison criterion table 107 to thereby prepare document trees. The steps of a parsing program for the structured documents are shown in detail in FIG. 2B.

In the process, the elements allocated to each node of the document tree are determined according to the rules established as follows:

Rule 1: Allocate each tag to a node.
Rule 2: Allocate the character strings sandwiched between a start tag and an end tag to a child node of the start tag.
Rule 3: Allocate each end tag to a child node of the start tag associated with the particular end tag.
Rule 4: Allocate the character strings sandwiched between identity tags to a single node together with the starting and end tags thereof.
Rule 5: Don't allocate ignoring tags and the character strings sandwiched between the ignoring tags to any node.
Rule 6: Allocate equivalence tags to nodes by converting the apparently different names thereof into an identical tag name.

Step 204

The document trees prepared by the abovementioned steps are compared by node with each other and the difference is extracted by node. In the case where the tags to be compared are no-comparison tags, the particular nodes and underlying nodes (child nodes) are not compared.

Step 205

The difference is extracted, this time, by character, only for the nodes found to be non-coincident. For a node of an identity tag, however, comparison by character is made only when the leading character (string) constituting a tag of the node is coincident. The ignoring tags that were not compared at step 204 are compared at the present step.

Step 206

The difference extraction output of step 205 is displayed on the display unit of the terminal device 102 (step 206A).

At the same time, the same difference output can be supplied to a difference data utilization device in parallel to the display unit. The CPU 101 can automatically execute such processes as updating and revision of relevant parameters in accordance with the difference output. These functions can be considered as a review. FIG. 2B shows the process of parsing structured documents in steps 301 to 311.

Processing Example 1

A specific example of processing according to the embodiment having an identity tag is described below with reference to the example documents shown in FIGS. 3A and 3B.

Step 201

The structured documents are edited by the document editing program 104 (FIG. 1). The document of FIG. 3B is assumed to have been edited from that of FIG. 3A.

Step 202

The comparison criterion table 107 corresponding to the DTD of the SGML documents to be compared is read out to the CPU 101.

In the absence of a corresponding comparison criterion table, an appropriate table is first produced and entered.

A comparison criterion table as shown in FIG. 9, for example, is produced from FIGS. 3A and 3B. Specifically, "<NAME>" and "<TRANSMISSION DATE>" are defined as identity tags, which means that character strings are not matched unless the tags are coincident between the documents to be compared.

Step 203

Once the difference extraction program 106 is called, the structured documents to be compared are analyzed by the structured document parsing program 105 while referring to the comparison criterion table 107, thereby producing corresponding document trees.

Figure 10A:
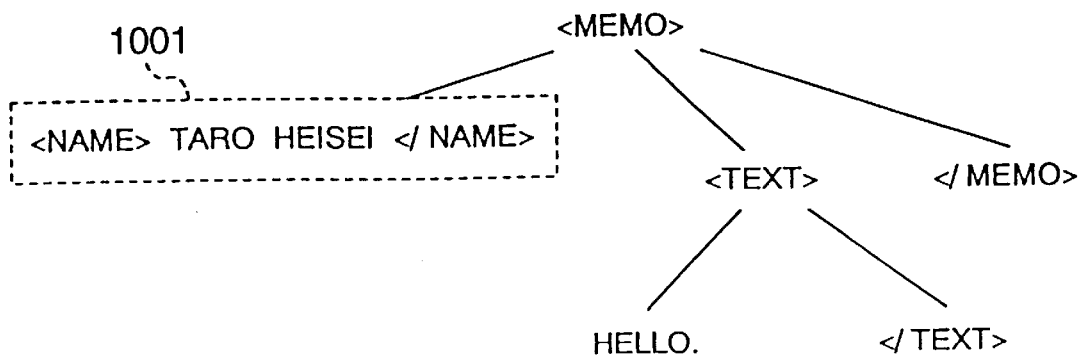
FIGS. 10A, 10B are diagrams showing document trees produced from the first example of structured documents before and after editing shown in FIGS. 3A, 3B on the basis of the comparison criterion table of FIG. 9.
Figure 10B:
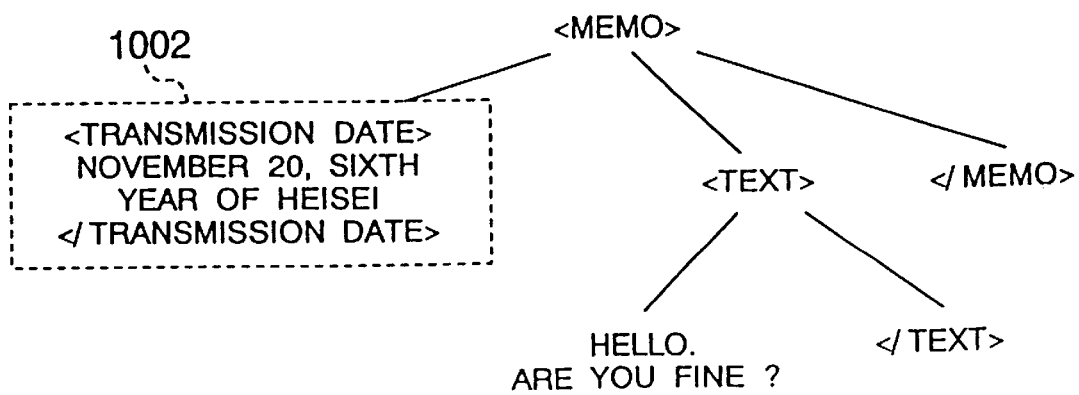

By applying the rules described above with reference to an embodiment, the document trees of FIGS. 10A, 10B are produced from the structured documents of FIGS. 3A, 3B respectively by referring to the comparison criterion table of FIG. 9.

Figure 10C:
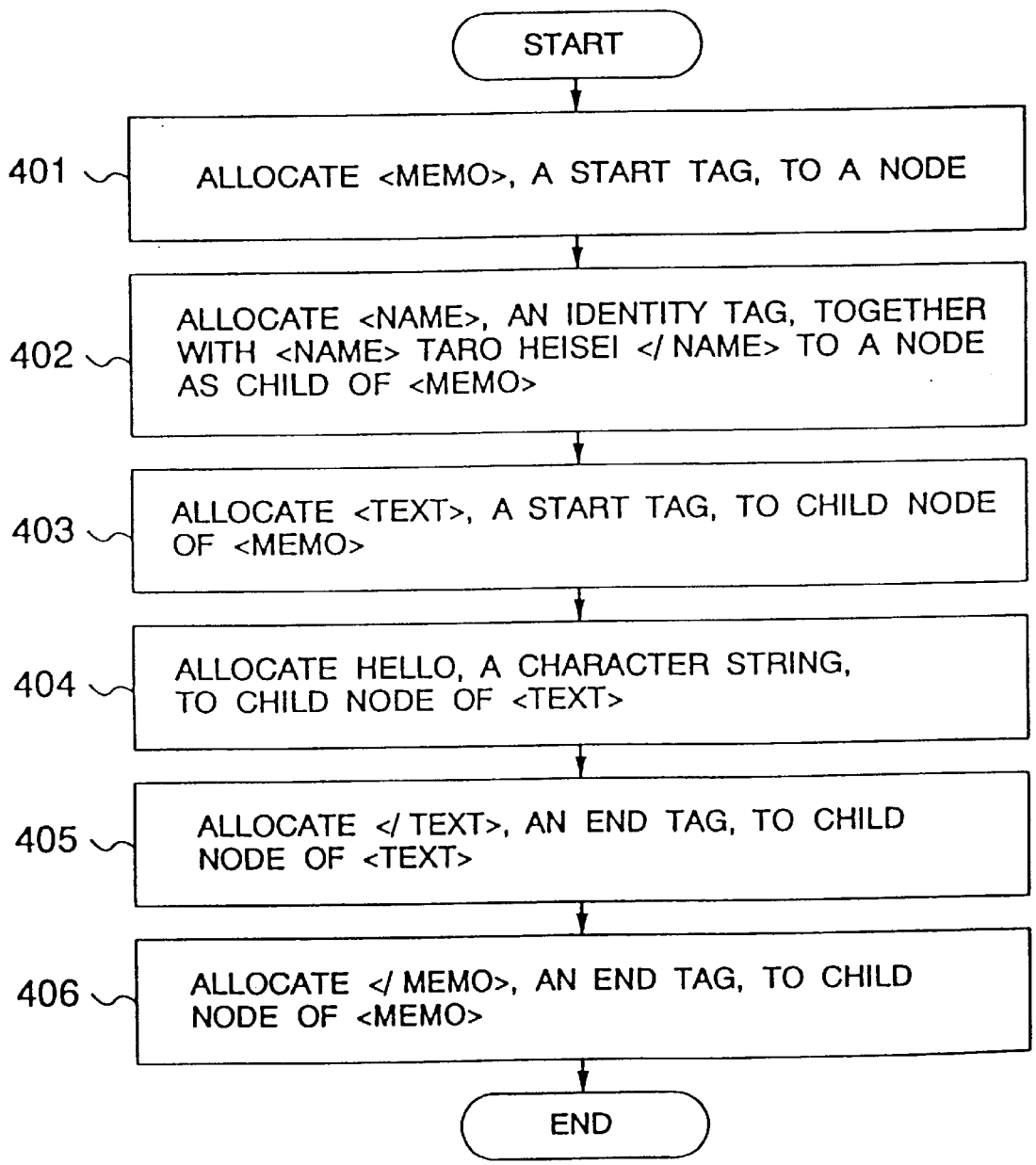
FIG. 10C is a flow diagram showing production procedure for document tree of FIG. 10A.

Structured documents 1001, 1002 in FIGS. 10A, 10B have identity tags and therefore the tags and content characters thereof are allocated collectively to a single node according to Rule 4. The process of producing document trees of FIGS. 10A, 10B for difference extraction is shown as steps 401 to 406 in FIG. 10C.

Step 204

The difference is extracted by node between the document trees.

Since comparison is made by node, "<NAME>" and "<TRANSMISSION DATE>" which are identity tags are not matched as long as the particular tags and the character strings of the contents thereof are both coincident with each other. In such a case, due to the non-coincidence between the tags 1001 and 1002, both the tags and the contents thereof are extracted as a difference.

Step 205

The difference between non-coincident nodes is extracted by character. Nodes having an identity tag, however, are compared by character only in the case where the leading character string constituting each of the tags of the respective nodes is coincident.

Step 206

The resulting difference is displayed on the terminal device 102.

An example result of difference extraction between the documents of FIGS. 3A and 3B is shown in FIG. 11.

FIG. 11B shows the result of extracting difference character strings taken of the structured document of FIG. 3B as compared with the structured document of FIG. 3A. FIG. 11A, on the other hand, shows the result of extracting difference character strings taken of the structured document of FIG. 3A as compared with the structured document of FIG. 3B.

In FIG. 11B, the tag marks "<NAME>" and "<TRANSMISSION DATE>" of nodes 1001 and 1002 fail to coincide with each other, and therefore the character string "<TRANSMISSION DATE> NOVEMBER 20, SIXTH YEAR OF HEISEI </TRANSMISSION DATE>" of node 1002 is extracted in its entirety as a difference. Also, since FIG. 3A contains no description of "ARE YOU FINE" in FIG. 3B, "ARE YOU FINE" is extracted as a difference.

If the difference extraction is executed according to the above-mentioned steps, as long as a tag containing the characters the comparison of which is meaningless in the absence of tag coincidence is entered as an identity tag, structured documents of non-coincident logical structures are not matched with each other. A more appropriate difference extraction result thus can be presented to the editor.

Processing Example 2

The document examples of FIGS. 5A, 5B will be explained as a second specific process according to the embodiment with reference to the case having both an identity tag and an ignoring tag and involving a structural displacement.

Step 201

Structured documents are edited by the document editing program 104. The document of FIG. 5B is assumed to have been edited from the document of FIG. 5A.

Step 202

The comparison criterion table 107 corresponding to the DTD of the SGML document to be compared is read at this step.

In the absence of a corresponding comparison criterion table, an appropriate table is produced and entered.

In the case of FIGS. 5A, 5B, for example, a comparison criterion table as shown in FIG. 12 is produced. Specifically, "<AUTHOR NAME>" is defined as an identity tag. In this case, as described above, the character strings are compared with each other only when the tags are coincident with each other. Also, "<CHAPTER NUMBER>" is defined as an ignoring tag. In this case, the difference in chapter number is ignored. This is because it has no effect on difference extraction.

Step 203

Once the difference extraction program 106 is called, the SGML documents are analyzed by the structured document parsing program 105, and corresponding document trees are produced while referring to the comparison criterion table 107.

Figure 13A:
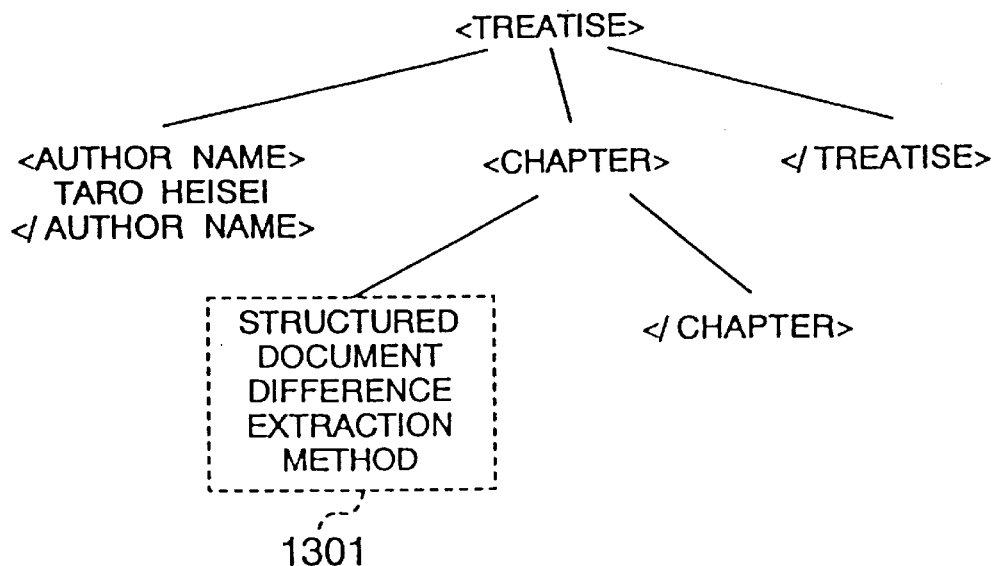
FIGS. 13A, 13B are diagrams showing document trees produced from the second example of the structured documents before and after editing shown in FIGS. 5A, 5B, respectively on the basis of the comparison criterion table of FIG. 12.
Figure 13B:
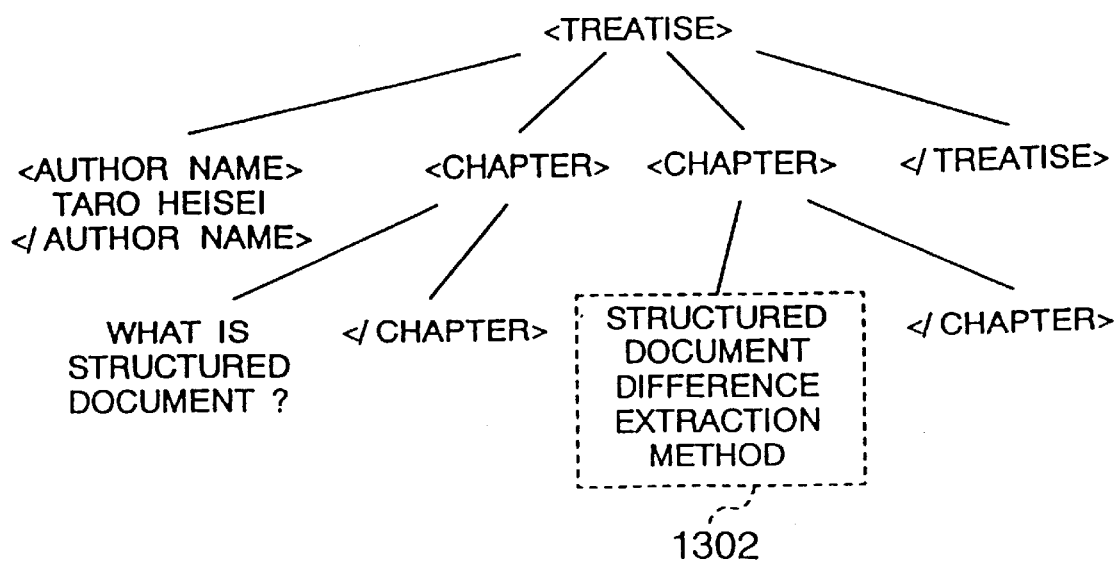

By application of the rules explained with reference to an embodiment above, the document trees of FIGS. 13A, 13B are produced by referring to the comparison criterion table of FIG. 12 from the documents of FIGS. 5A, 5B. "<CHAPTER NUMBER>" providing an ignoring tag is not allocated as a node according to Rule 5 above.

Step 204

The difference between document trees is extracted by node.

The ignoring tags, which are not present as a node, are not compared and have no effect on the whole process of difference extraction.

Step 205

The difference between non-coincident nodes is extracted by character string. The ignoring tags and the contents thereof that were not compared at step 204 are also compared at this step.

Step 206

The resulting difference is displayed on the terminal device 102.

An example result of difference extraction between the documents of FIGS. 5A and 5B is shown in FIGS. 14A, 14B. FIG. 14B shows the result of extracting a difference character string taken of the structured document of FIG. 5B as compared with the structured document of FIG. 5A. FIG. 14A, on the other hand, is a diagram showing the result of extracting a difference character string taken of the structured document of FIG. 5A as compared with the structured document of FIG. 5B.

Explanation will be made about the case in which the difference is taken of the structured document of FIG. 5B as compared with the structured document of FIG. 5A and the result of extracting the difference character string is obtained as shown in FIG. 14B.

In the difference extraction by node between document trees at step 204, "<TREATISE>", "</TREATISE>", "<AUTHOR NAME> TARO HEISEI </AUTHOR NAME>", and "<CHAPTER> STRUCTURED DOCUMENT DIFFERENCE EXTRACTION METHOD </CHAPTER>" are determined to be coincident in FIGS. 13A, 13B, so that they are displayed as coincident parts in FIG. 14B.

Since step 204 decides that "<CHAPTER> STRUCTURED DOCUMENT DIFFERENCE EXTRACTION METHOD </CHAPTER>" is coincident, step 205 decides that "<CHAPTER NUMBER> and </CHAPTER NUMBER>" associated with the coincident part is also coincident. On the other hand, "CHAPTER 2", which is not coincident with "CHAPTER 1", is extracted as a difference and displayed as shown in FIG. 14B.

Also, due to the decision at step 204 that "<CHAPTER> WHAT IS STRUCTURED DOCUMENT? </CHAPTER>" in FIG. 13B is not coincident, this "<CHAPTER> WHAT IS STRUCTURED DOCUMENT? </CHAPTER>" and "<CHAPTER NUMBER> CHAPTER 1 </CHAPTER NUMBER>" associated with the particular non-coincident part are extracted as a difference and displayed as shown in FIG. 14B.

In the difference extraction according to the steps described above, document trees are compared by node, i.e., by structure, and therefore nodes 1301 and 1302, for example, are matched in this process. As a result, it is seen that an erroneous matching does not occur over different structures as shown in FIG. 6. Since comparison of document trees by node includes no comparison between ignoring tags, any difference in the contents of the ignoring tags is seen to have no effect on the difference extraction process as a whole.

Processing Example 3

A third specific processing example according to an embodiment having an identity tag and an equivalence tag will be explained with reference to the example documents of FIGS. 7A, 7B.

Step 201

Structured documents are edited by the document editing program 104. It is assumed that the document of FIG. 7B is edited from the document of FIG. 7A.

Step 202

A comparison criterion table 107 corresponding to the DTD of the SGML documents to be compared is read at this step.

In the absence of a corresponding comparison criterion table, an appropriate table is produced and entered.

In the case of FIGS. 7A, 7B, a comparison criterion table as shown in FIG. 15 is produced. In other words, "<AUTHOR NAME>" is defined as an identity tag. In this case, as long as given tags fail to coincide with each other, the character strings associated with them are not matched. Also, "<ITEM>" and "<FIRST ITEM>" are defined as equivalence tags. In the last case, "<ITEM>" and "<FIRST ITEM>" are considered to have the same logical structure.

Step 203

Once the difference extraction program 106 is called, the SGML document is analyzed by the structured document parsing program 105 and document trees are produced while referring to the comparison criterion table 107.

Figure 16A:
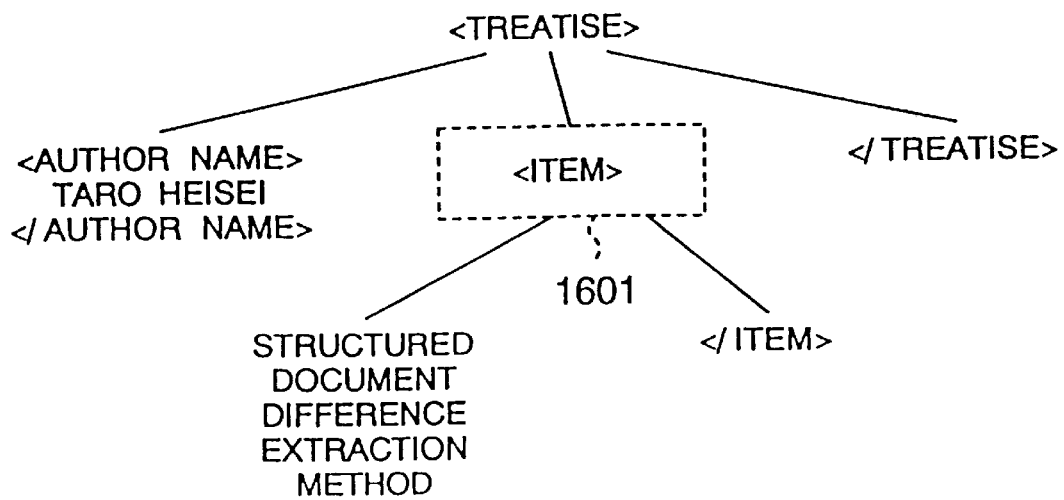
FIGS. 16A, 16B are diagrams showing document trees produced from the third example of the structured documents before and after editing shown in FIGS. 7A, 7B, respectively on the basis of the comparison criterion table of FIG. 15.
Figure 16B:
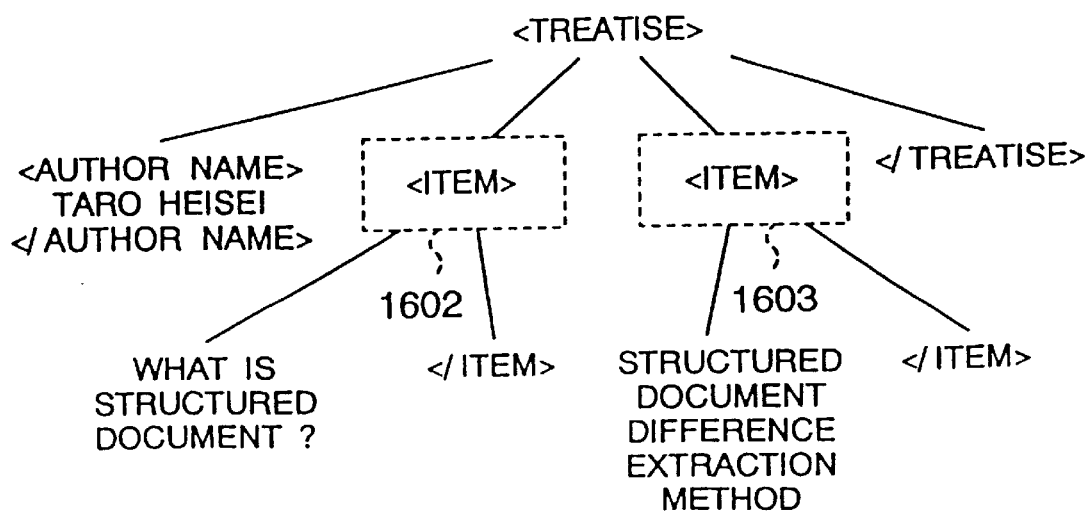

Application of the rules described above with reference to an embodiment permits the document trees of FIGS. 16A, 16B to be produced from the documents of FIGS. 7A, 7B respectively by reference to the comparison criterion table of FIG. 15.

Nodes 1601, 1602, 1603 in FIG. 16 are converted into the same tag name under Rule 6.

Step 204

The difference between the document trees is extracted by node. The equivalence tags are given the same tag name and therefore are not extracted as a difference.

Step 205

Only those tags which are found non-coincident with each other are extracted, this time, by character.

Step 206

The resulting difference is displayed on the terminal device 102.

An example of extracting the difference between the documents of FIGS. 7A, 7B is shown in FIGS. 17A, 17B.

FIG. 17B shows the result of extracting difference character strings taken of the structured document of FIG. 7B as compared with the structured document of FIG. 7A, and FIG. 17A is the result of extracting difference character strings taken of the structured document of FIG. 7A as compared with the structured document of FIG. 7B.

Explanation will be made about the case in which the difference is taken of the structured document of FIG. 7B as compared with the structured document of FIG. 7A and the extraction result of FIG. 17B is obtained.

In extracting the difference between the document trees by node at step 204, it is decided in FIGS. 16A, 16B that "<TREATISE>", "</TREATISE>", "<AUTHOR NAME> TARO HEISEI </AUTHOR NAME>", and "<ITEM> STRUCTURED DOCUMENT DIFFERENCE EXTRACTION METHOD </ITEM>" are determined to be coincident, and are displayed as coincident parts in FIG. 17B.

Next, due to the decision at step 204 that "<ITEM> WHAT IS STRUCTURED DOCUMENT? </ITEM>" is non-coincident, step 205 extracts the difference of the non-coincident part by character, so that "<ITEM> WHAT IS STRUCTURED DOCUMENT? </ITEM>" is extracted as a difference and displayed as shown in FIG. 17B.

Upon extraction of the difference according to the steps described above, the documents having the same logical structure are seen to be matched with each other despite the difference in tag name.

Processing Example 4

A fourth specific processing example according to an embodiment will be explained with reference to the documents of FIGS. 18A, 18B having a no-comparison tag.

Step 201

A structured document is edited by the document editing program 104. The document of FIG. 18B is assumed to be edited from the document of FIG. 18A.

Step 202

A comparison criterion table 107 is read in which corresponds to the DTD of the SGML document to be compared.

In the absence of a corresponding comparison criterion table, an appropriate table is produced and entered.

In the case of FIGS. 18A, 18B, for example, a comparison criterion table as shown in FIG. 19 is produced. In other words, "<SENDER>" and "<RECEIVER>" are assumed to have a no-comparison tag. In this case, "<SENDER>" and "<RECEIVER>" are not compared in contents.

Step 203

Once the difference extraction program 106 is called, the SGML document is analyzed by the structured document parsing program 105 and a document tree is produced while referring to the comparison criterion table 107.

Figure 20A:
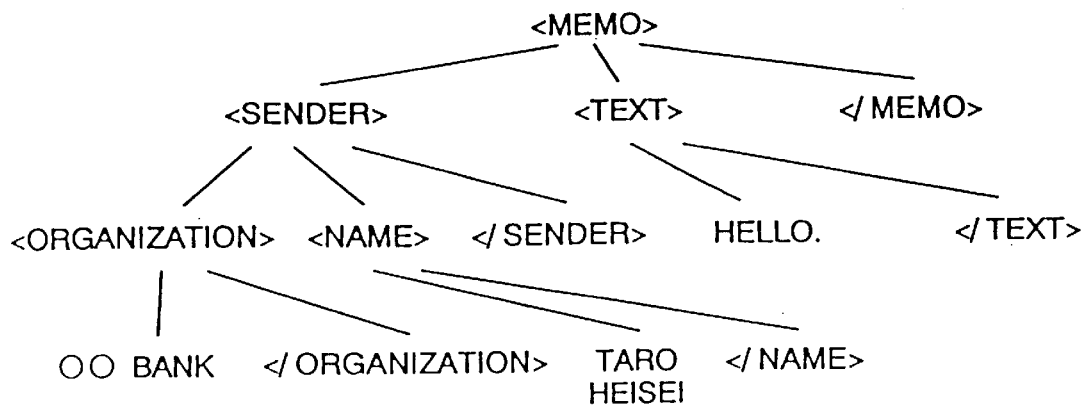
FIGS. 20A, 20B are diagrams showing document trees produced from the fourth example of the structured documents before and after editing respectively shown in FIG. 18 on the basis of the comparison criterion table of FIG. 19.
Figure 20B:
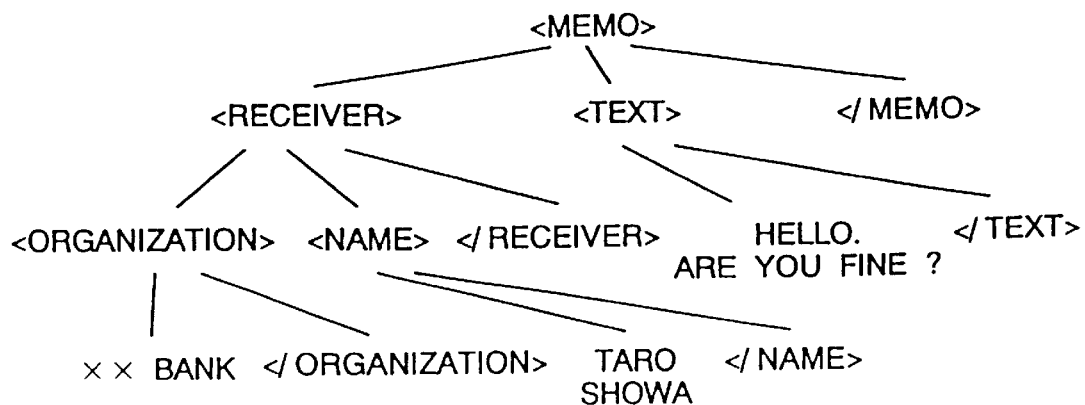

By applying the rules described above with reference to an embodiment, the document trees of FIGS. 20A, 20B are completed from the documents of FIGS. 18A, 18B by referring to the comparison criterion table of FIG. 19.

Step 204

The difference between document trees is extracted by node. "<SENDER>" and "<RECEIVER>" have tags of no-comparison type, and therefore underlying nodes, that is, "<ORGANIZATION>" and "<NAME>" providing child nodes, are not compared.

Step 205

The difference between only those nodes which are non-coincident with each other is extracted, this time, by character.

Step 206

The resulting difference is displayed on the terminal device 102.

An example of extracting the difference between the documents of FIGS. 18A, 18B is shown in FIG. 21.

FIG. 21B shows the result of extracting the difference character string taken of the structured document of FIG. 18B as compared with the structured document of FIG. 18A, and FIG. 21A the result of extracting the difference character string taken of the structured document of FIG. 18A as compared with the structured document of FIG. 18B.

Explanation will be made about the case in which the difference is taken of the structured document of FIG. 18B as compared with the structured document of FIG. 18A thereby to obtain the result of extracting the difference character string shown in FIG. 21B.

In extracting the difference between the document trees by node at step 204, as shown in FIGS. 18A, 18B, "<MEMO>", "</MEMO>", "<TEXT>" and "</TEXT>" are determined to be coincident with each other, while "<RECEIVER>", "</RECEIVER>" and the contents thereof including "<ORGANIZATION> 00 BANK </ORGANIZATION>" and "<NAME> TARO HEISEI </NAME>" are determined to be a difference, since "<SENDER>" and "<RECEIVER>" are a no-comparison tag. "Hello ARE YOU FINE?" is determined to be non-coincident.

Due to the non-coincidence decision on "Hello ARE YOU FINE?" at step 204, step 205 extracts the difference by character for the non-coincident part, so that "ARE YOUR FINE?" is extracted as a difference.

As a consequence, the document as shown in FIG. 21B is displayed.

In the difference extraction following the steps described above, once tags with the contents thereof not compared are entered as no-comparison tags, underlying nodes (child nodes) are not compared, and therefore the organizations and the names contained in "<SENDER>" and "<RECEIVER>" are not matched with each other, thereby making it possible to present a more appropriate result of difference extraction to the editor.

Figure 22:
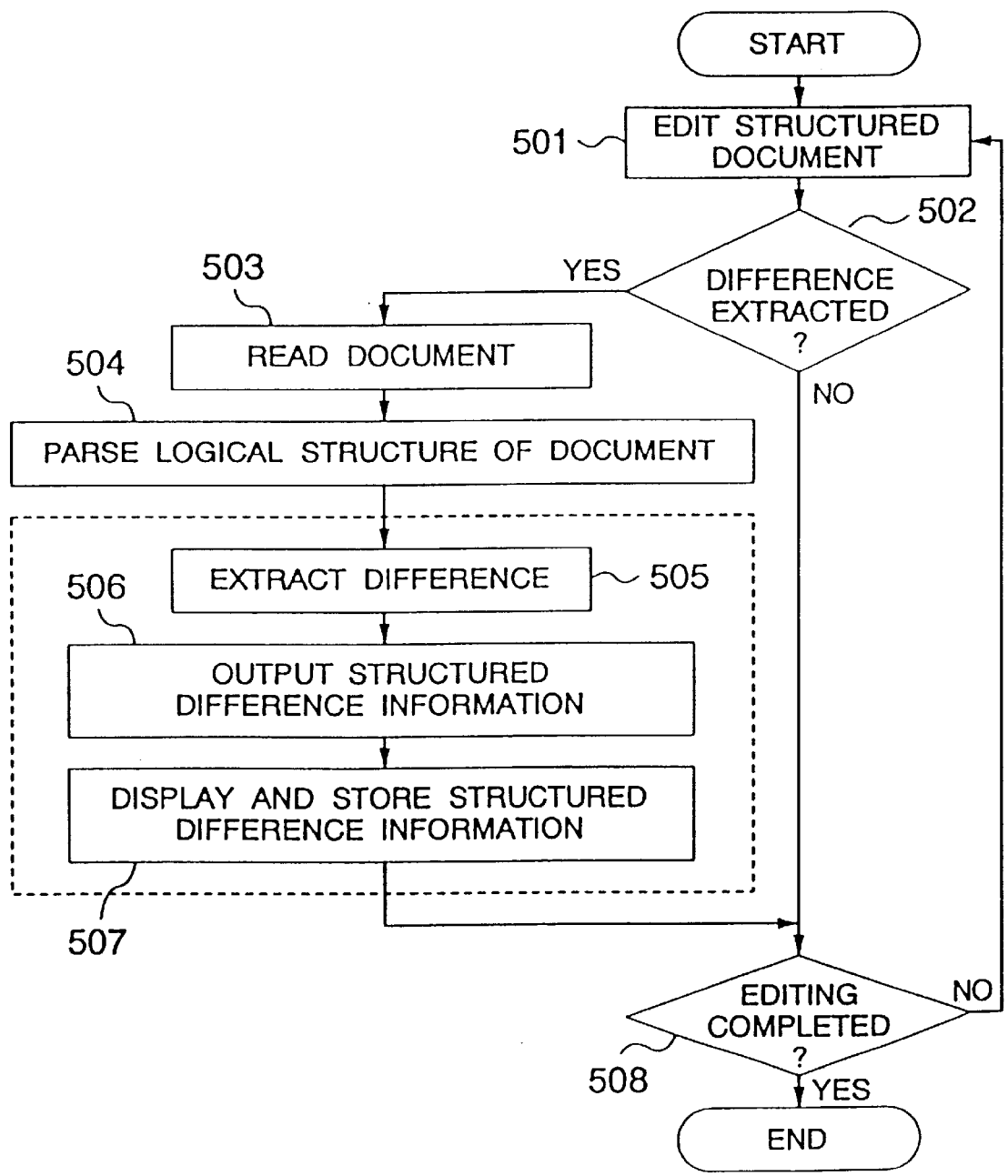
FIG. 22 is a flowchart showing another embodiment of the invention.

Another embodiment of the invention is shown in FIG. 22. The difference information which is extracted as a change between structured documents before and after editing using the scheme as disclosed in the above-mentioned embodiments has the following features different from comparison between non-structured documents:

(1) the change of the structure per se and the change of character strings in the structure are involved; and (2) the difference information has a logical structure. This will be described with reference to structured documents shown in FIGS. 23A and 23B.

FIG. 24A shows an example result of comparing a structured document a before edition with a structured document a' after edition shown in FIGS. 23A and 23B. Item 1 (601) and item 3 (603) represent an example in which the character strings in a structure are altered without altering the document structures including "<NAME>" and "<TEXT>". Item number 2 (602) shows an example in which the structure of "<ORGANIZATION>" is newly inserted.

Now, an example will be explained in which the difference information between structured documents has a logical structure. For example, item number 1 (601) and item number 3 (603) represent an alteration in character string. If the difference information is to be expressed by specifying a structure, for example, to the effect that the character string alteration is one occurring in the structure of "<NAME>" and "<TEXT>" respectively, then the difference data is required to have structural information. Also, item number 2 (602) has structural information that the inserted "<ORGANIZATION>", which lies within the framework of the logical structure "<SENDER>", is a child structure of "<SENDER>".

According to the prior art method, however, these characteristics of the difference data of structured documents could not be displayed effectively. According to the prior art method, even if an alteration is one of information relating to the logical structure of a document, it is displayed by altering the display attribute of the character indicating the structure without discriminating it from an alteration in the character string. The resulting problem is that it is difficult for the user to determine whether the structure or the content of the structure is altered. This problem is described with reference to a specific example. FIG. 24B shows an example display of difference data according to a comparative example of JP-A-7-200370. In this display method, the structural information is ignored without discriminating the alteration of a structure from that of a character string in the structure. Consequently, the actual alteration that is executed cannot be easily understood by the user who edits the structured document by means of a document editing software or the like. Also, when the document editing software or the like uses a dedicated display program by expressing the structural information in a tree for displaying a structured document, a separate display program is required for displaying the difference data such as shown in FIGS. 24A, 24B, thereby inconveniently complicating the program.

The embodiment of FIG. 22, as compared with the embodiment of FIG. 1 in which the altered parts between structured documents are extracted on the basis of logical structure information, is different in that step 507 is added for displaying and storing (editing) the difference information from a structured difference information output step 505. Steps 501 to 506, therefore, are substantially similar to steps 201 to 206 in FIG. 1.

Figure 26A:
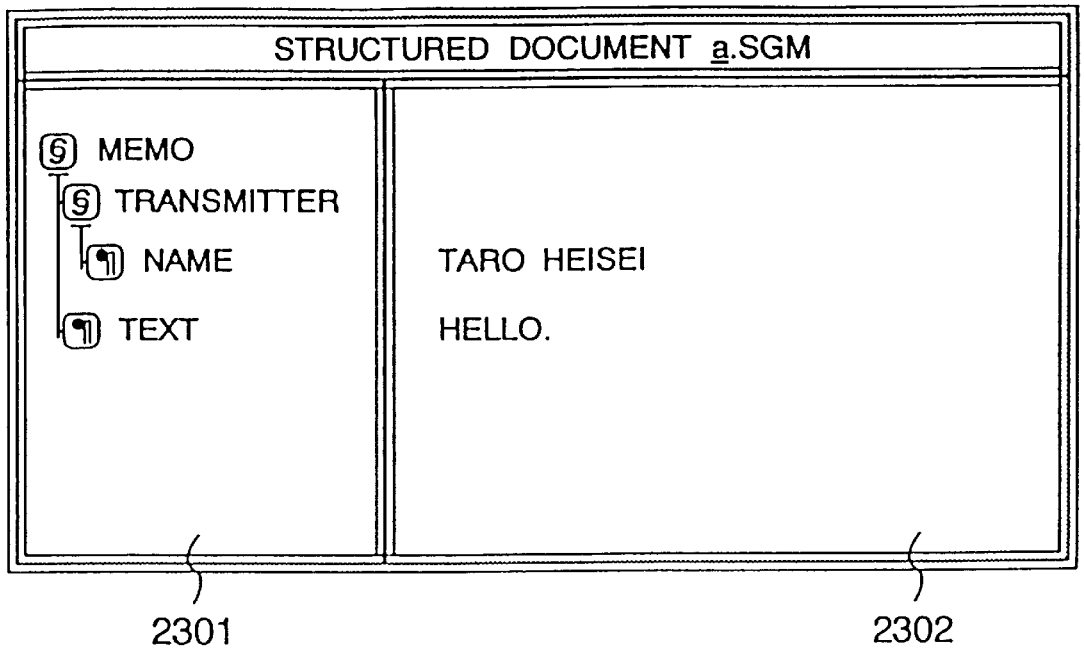
FIGS. 26A, 26B are diagrams showing an example of structured documents displayed on the screen before and after editing respectively.
Figure 26B:
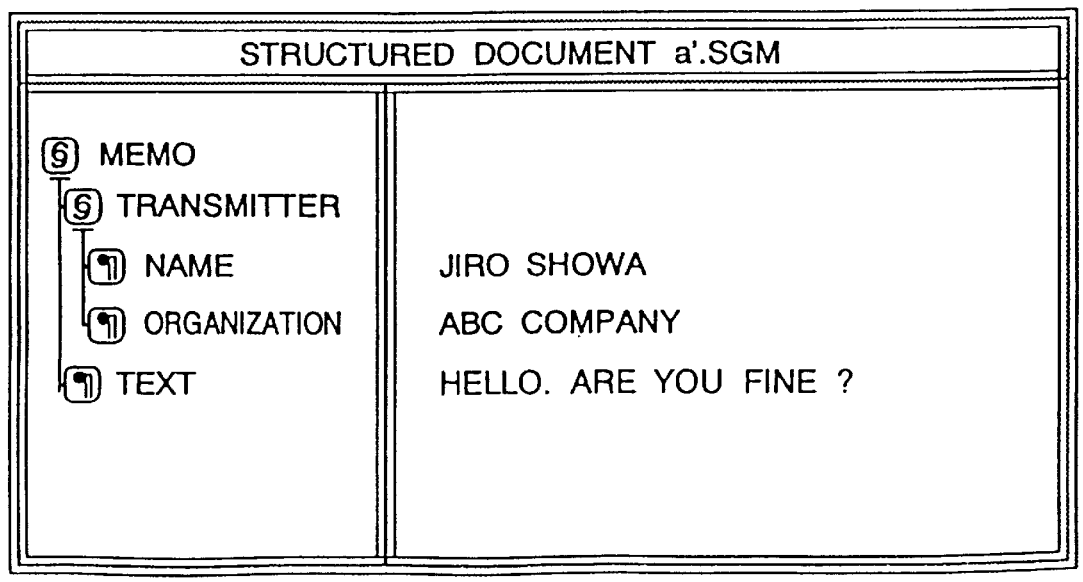

Step 507 displays the resulting difference on the terminal device 102 according to a display/preserve program 110, and stores the structured difference data in a secondary memory unit 103. Since the difference data as illustrated in FIG. 25 is output in SGML form, the difference data can be displayed directly using an editor or a viewer exclusive to SGML. FIGS. 26A and 26B show an example structured document displayed on a dedicated SGML editor, and FIG. 27 an example display of the difference data. In FIGS. 26A, 26B, numeral 2301 designates a window for displaying the structure, and numeral 2302 a window for displaying the character strings in the structure. FIG. 27 shows an example window displaying the difference data of FIG. 25 in structured form. In the process, an alteration of a structure is displayed by altering the color or type of the mark representing the structure, by defining the altered part by a solid line or by otherwise discriminating the altered part. An altered part of a character string is also displayed in discrimination from other character strings in similar fashion. These discriminated display may be highlighted.

With the foregoing steps, the difference data can be directly displayed in structured form by incorporating this scheme in the SGML document edition software as a document comparison function. By discriminating an alteration in a structure from that of a character string in a structure, for example, the actual alteration can be easily understood by the user editing the structured document by means of the document edition software or the like. Also, even when the document editing software or the like uses a dedicated program for indicating structural information by a tree when displaying a structured document, an altered part can be displayed without any independent display program. Similarly to the embodiment of FIG. 2A, the structured difference data may be used to update and/or revise structured documents to be edited in the step 507 or after completion of editing using known document (update) processing programs.

It will thus be understood from the foregoing description that according to the present invention, a comparison criterion corresponding to a logical structure of a structured document is defined, and the difference of a structured document to be compared is extracted in such a manner as to meet the comparison criterion, whereby a difference conforming with the sense of the editor is extracted in accordance with the meaning of the logical structure. Also, the difference between document trees representing structures is extracted by node, and any difference between the non-coincident nodes of the documents to be compared is extracted by character. Consequently, a difference over different structures, if any, is not extracted, with the result that the editor can grasp the difference suitable for the particular logical structure, thereby improving the efficiency of editing a structured document. The present invention is effectively applicable to automatic updating of documents likely to be revised including various legal documents and operation manuals described in SGML or the like language. Further, the efficient editing according to the invention is effective for managing plates of documents which are required to be updated frequently.

What is claimed is:

1. An inter-document difference extraction method comprising the steps of:

inputting a first and a second structured document each including a plurality of elements and internal information thereof;

comparing the elements and internal information regarding said elements of said first input structured document and said second input structured document to detect an element and internal information thereof coinciding between both said first input structured document and said second input structured document; and extracting, as a difference between said first and second input structured documents, a non-coinciding element and internal information thereof determined by said comparing step;

wherein said comparing step, when any of the elements to be compared between said first and second input structured documents is defined as a compare-exceptional (non-comparative objective) element, determines that the corresponding internal information of the elements do not coincide even if the elements corresponding thereto are identical.

2. An inter-document difference extraction method according to claim 1, wherein said comparing step uses tags in the structured documents for comparison of said elements.

3. An inter-document difference extraction method comprising the steps of:

inputting a first and a second structured document each including a plurality of elements and internal information thereof;

comparing the elements and internal information regarding said elements of said first input structured document and said second input structured document to detect an element and internal information thereof coinciding between both said first input structured document and said second input structured document; and extracting, as a difference between said first and second structured documents, a non-coinciding element and internal information thereof determined by said comparing step;

wherein said comparing step, when said elements are predefined elements belonging to a same element group, determines that the internal information of the elements is identical if the internal information is identical but the elements are not identical.

4. An inter-document difference extraction method according to claim 3, wherein said comparing step uses tags in the structured documents for comparison of said elements.

5. An inter-document difference extraction method comprising the steps of:

inputting a first and a second input structured documents each including a plurality of elements and internal information thereof;

comparing the elements and internal information regarding said elements of both said first input structured document and said second input structured document to detect an element and internal information thereof coinciding between both said first input structured document and said second input structured document; and extracting, as a difference, between said first and second structured documents, a non-coinciding element and internal information thereof determined by said comparing step;

wherein said comparing step, when elements to be compared in said comparing step are predefined as elements belonging to pairs of non-comparative elements, determines that the elements do not coincide even if the internal information thereof are identical.

6. An inter-document difference extraction method according to claim 5, wherein said comparing step uses tags in the structured documents for comparison of said elements.

7. An inter-document difference extraction apparatus, comprising:

input means for inputting a first and a second structured document each including a plurality of elements and internal information thereof;

comparing means for comparing elements and internal information regarding said elements of both said first input structured document and said second input structured document to detect an element and internal information thereof coinciding between both said first input structured document and said second input structured document; and extracting means for extracting, as a difference between said first and second input structured documents, a non-coinciding element and internal information thereof determined by said comparing means;

wherein said comparing means, when any of the elements to be compared between said first and second input structured documents is defined as a compare-exceptional (non-comparative objective) element, determines that the corresponding internal information of the elements do not coincide even if the elements corresponding thereto are identical.

8. An inter-document difference extraction apparatus, comprising:

input means for inputting a first and a second structured document each including a plurality of elements and internal information thereof;

comparing means for comparing elements and internal information regarding said elements of both said first input structured document and said second input structured document to detect an element and internal information thereof coinciding in both said first input structured document and said second input structured document; and extracting means for extracting, as a difference between said first and second input structured documents, a non-coinciding element and internal information thereof determined by said comparing means;

wherein said comparing means, when said elements are predefined elements belonging to a same element group, determines that the internal information of the elements is identical if the internal information is identical but the elements are not identical.

9. An inter-document difference extraction apparatus, comprising:

input means for inputting a first and a second structured document each including a plurality of elements and internal information thereof;

comparing means for comparing the elements and internal information thereof of both said first input structured document and said second input structured document to detect an element and internal information thereof coinciding between both said first input structured document and said second input structured document; and extracting means for extracting, as a difference between said first and second structured documents, a non-coinciding element and internal information thereof determined by said comparing means;

wherein said comparing means, when elements to be compared by said comparing means are predefined as elements belonging to pairs of non-comparative objective elements, determines that the elements do not coincide even if the internal information thereof are identical.

10. A computer-readable recording medium storing a program for implementing inter-document difference extraction, said program comprising the steps of:

inputting a first and a second structured document each including a plurality of elements and internal information thereof;

comparing the elements and internal information thereof of both said first input structured document and said second input structured document to detect an element and internal information thereof coinciding between both said first input structured document and said second input structured document; and extracting, as a difference between said first and second input structured documents, a non-coinciding element and internal information thereof determined by said comparing step;

wherein said comparing step, when any of the elements to be compared between said first and second input structured documents is defined as a compare-exceptional (non-comparative objective) element, determines that the corresponding internal information of the elements do not coincide even if the elements corresponding thereto are identical.

11. A computer-readable recording medium storing a program for implementing inter-document difference extraction, said program comprising the steps of:

inputting a first and a second structured document each including a plurality of elements and internal information thereof;

comparing the elements and internal information regarding said elements of said first input structured document and said second input structured document to detect an element and internal information thereof coinciding between both said first input structured document and said second input structured document; and extracting, as a difference between said first and second structured documents, a non-coinciding element and internal information thereof determined by said comparing step;

wherein said comparing step, when said elements are predefined elements belonging to a same element group, determines that the internal information of the elements is identical if the internal information is identical but the elements are not identical.

12. A computer-readable recording medium storing a program for implementing inter-document difference extraction, said program comprising the steps of:

inputting a first and a second input structured documents each including a plurality of elements and internal information thereof;

comparing the elements and internal information regarding said elements of both said first input structured document and said second input structured document to detect an element and internal information thereof coinciding between both said first input structured document and said second input structured document; and extracting, as a difference, between said first and second structured documents, a non-coinciding element and internal information thereof determined by said comparing step;

wherein said comparing step is performed for the elements other than predefined elements belonging to pairs of non-comparative objective elements from comparison of elements.

13. An inter-document difference extraction program comprising the steps of:

inputting a first and a second structured document each including a plurality of elements and internal information thereof;

comparing the elements and internal information thereof of both said first input structured document and said second input structured document; and extracting, as a difference between said first and second structured documents, a non-coinciding element and internal information thereof determined by said comparing step;

wherein said comparing step, when any of the elements to be compared between said first and second input structured documents is defined as a compare-exceptional (non-comparative objective) element, determines that the corresponding internal information of the elements do not coincide even if the elements corresponding thereto are identical.

14. An inter-document difference extraction program comprising the steps of:

inputting a first and second structured document each including a plurality of elements and internal information thereof;

comparing the elements and internal information thereof of both said first input structured document and said second input structured document; and extracting, as a difference between internal information of the elements by comparing the internal information of the elements of said first and second structured documents, a non-coinciding element and internal information thereof determined by said comparing step;

wherein said comparing step, when said elements are predefined elements belonging to a same element group, determines that the internal information of the elements is identical if the internal information is identical but the elements are not identical.

15. An inter-document difference extraction program comprising the steps of:

inputting a first and a second input structured documents each including a plurality of elements and internal information thereof;

comparing the elements and internal information regarding said elements of both said first input structured document and said second input structured document to detect an element and internal information thereof coinciding between both said first input structured document and said second input structured document; and extracting, as a difference, between said first and second structured documents, a non-coinciding element and internal information thereof determined by said comparing step;

wherein said comparing step, when elements to be compared in said comparing step are predefined as elements belonging to pairs of non-comparative elements, determines that the elements do not coincide even if the internal information thereof are identical.

* * * * *

UNITED STATES PATENT AND TRADEMARK OFFICE
CERTIFICATE OF CORRECTION

PATENT NO.    : 6,098,071
DATED         : August 1, 2000
INVENTOR(S)   : Y. AOYAMA, et al It is certified that error appears in the above-identified patent and that said Letters Patent is hereby corrected as shown below:

On the Title Page, left-hand column, after "[30] Foreign Application Priority Data" delete "Jun. 6, 1995" insert --Jun. 5, 1995--.

Signed and Sealed this

Seventeenth Day of April, 2001

Attest:

NICHOLAS P. GODICI

Attesting Officer   Acting Director of the United States Patent and Trademark Office